Patented Oct. 25, 1932

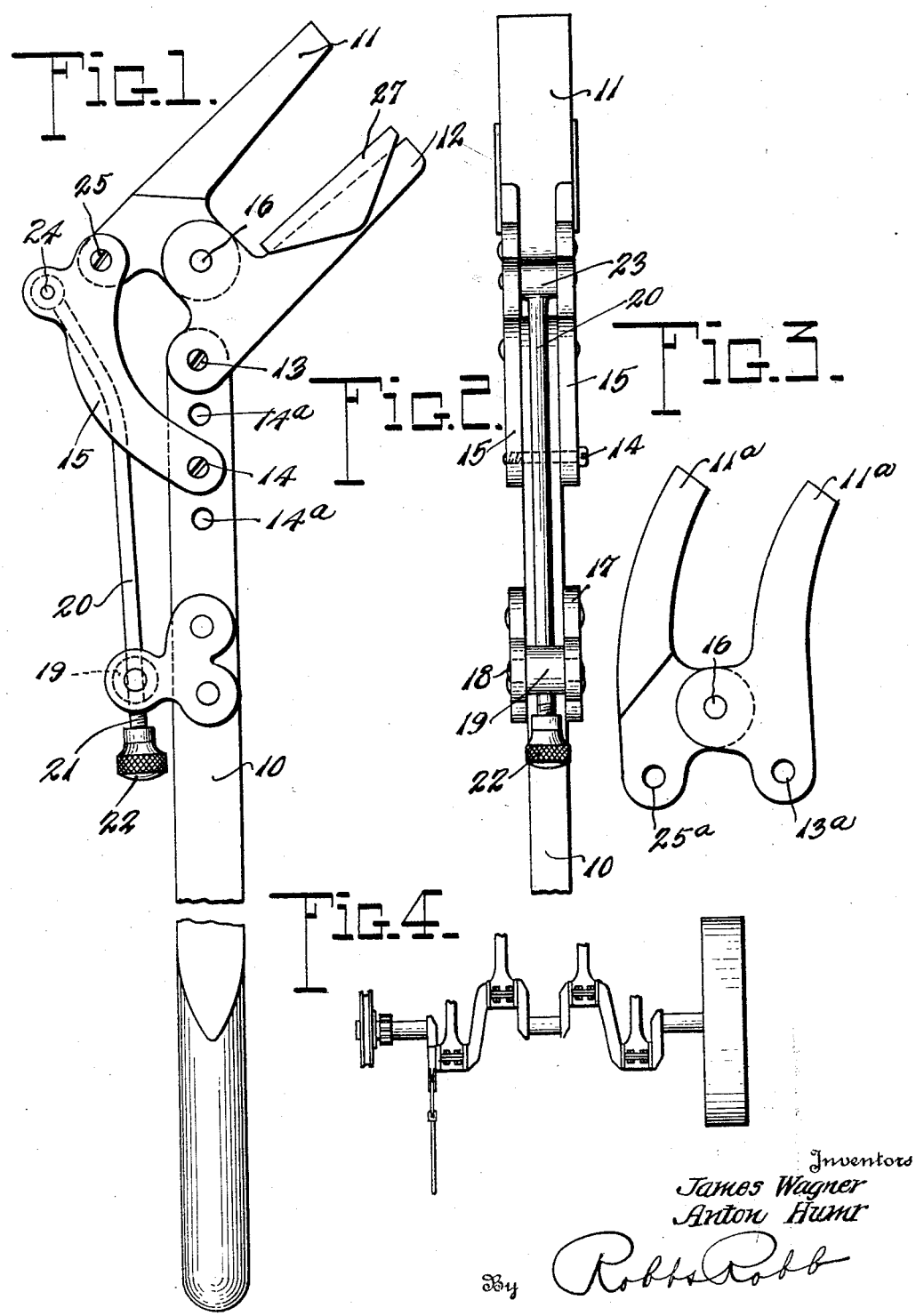

1,884,421

UNITED STATES PATENT OFFICE

JAMES WAGNER, OF PENINSULA, AND ANTON HUMR, OF CLEVELAND, OHIO

TOOL

Application filed March 24, 1931. Serial No. 525,003.

One of the principal objects of this invention is to provide a tool, especially for automobile mechanics, which will permit the ready gripping by a mechanic of the crank shaft of an automobile to effect turning of the shaft during the course of repairs or other work being done on an automobile mechanism, and it provides a tool of the wrench type which when operated in one direction will automatically release the part gripped in the jaws of the tool and when operated in the other direction will automatically increase the strength of the grip of the jaws.

A further object of this invention is to provide a tool of this character, the jaws of which may be interchangeable with jaws of other configuration where it is desired to utilize a tool for gripping the crank shaft of either a four cylinder or a six cylinder engine. The jaws are also arranged adjustable so that their grip may be rendered adjustable without necessitating the dismantling of the tool.

Other objects and advantages of the invention will become apparent by reference to the following description and the accompanying drawing in which Fig. 1 represents a side elevation of the tool;

Fig. 2 represents a rear elevation of the tool;

Fig. 3 represents a side elevation of a modified form of jaws adapted to replace the jaws of Fig. 1.

Fig. 4 represents a perspective view of the tool as applied to an automobile crank shaft.

Referring more particularly to the drawing, the tool is made up of the handle 10 upon which the jaws 11 and 12 are pivotally mounted, the jaw 12 being pivoted at 13 and the jaw 11 pivoted at 25, and there being provided for the jaw 11 a pair of corresponding link members 15 connecting the jaw 11 with the handle 10 the link members being of arcuate contour. The jaws 11 and 12 are also pivoted together at 16. As illustrated, the pivotal connections are conveniently in the form of screws, which render the parts readily interchangeable and adjustable.

The handle 10 carries the brackets 17 and 18 spaced apart by the spacing member 19 which is pierced to receive the rod 20, which is clearly shown in Fig. 1, one end of the rod 20 being threaded at 21 to receive the knurled cap 22, the other end of the rod 20 being secured to the member 23 which is pivoted to the members 15 as indicated at 24. The rod 20 is bent at 20a so that its connection with member 23 is offset with respect to the remainder of the rod. As previously mentioned, the members 15 are pivotally secured to the jaw 11, this connection being indicated at 25.

The rod 20 is slidable through the member 19, which is mounted in the brackets 17 and 18, this member 19 serving as an abutment member for the member 22. The member 19 is provided with a hole extending through for reception of the rod 20, this hole being sufficiently large to allow free play of the rod 20, and the member 19 is also sufficiently rotative to allow compensation of the rod 20 for any position of the jaws. It will be seen that the rod 20 and member 22 will cooperate so as to maintain the jaws 11 and 12 tightly gripping a piece of work when the tool is in operative engagement therewith, but will allow the jaws to release the work, as the rod 20 will slip through the member 19 until cap 22 abuts therewith in a counter-clockwise position, while causing the automatic tightening of the jaws when the handle is moved in clockwise direction; and these effects are produced without requiring any change in the position of the tool with respect to the object being worked upon, which is not the case in prior structures.

It will be apparent from the construction that as the handle 10 is operated in a clockwise direction the grip of the jaws 11 and 12 on the crank shaft 26 is increased since as the jaws are brought together, the knurled cap 22 acts as a stop, being brought into engagement with the handle 10; because of the bend in the rod 20 the engagement of the cap 22 with the handle 10 becomes increasingly tight as the handle 10 is moved clockwise holding the connection 24, thus forcing the jaws 11 and 12 more closely together through relative motion around the pivots 16 and 25 and increasing the grip thereof upon the crankshaft. This results in facilitating greatly the turning movement applied to the shaft.

When the handle 10 is brought into the opposite direction the reverse action takes place. The rod 20, being slidable through the spacing member 19, releases the engagement between the cap 22 and the handle 10 with the result that there is permitted a loosening of the grip of the jaws 11 and 12 owing to the movement of the cap 22 from its engagement with the handle 10 into engagement with abutment 19, these jaws moving relatively away from each other instead of towards each other, as previously described.

Because of the square configuration of the accessible portions of the crank shaft of a four cylinder engine, it is desirable that the jaws 11 and 12 be maintained in substantially parallel position at all times during operation of the tool irrespective of any relative turning movement between the jaws 11 and 12. For this purpose there is applied to the jaw 12 the flat member 27 which is firmly affixed to the jaw 12 and which member has its bearing surface perfectly flat; and while it is firmly secured to the jaw 12 its configuration is such that in operation of the tool it will be at all times adapted to firmly grip the surfaces of the crank shaft without danger of slipping.

By removing the bolt 14 and reinserting it into any of the other holes 14a with which the handle 10 is provided, it will be seen that the angle between the links 15 and the handle 10 may be adjusted to correspondingly adjust the width of the opening between the jaws 11 and 12; and by adjusting the position of the cap 22 upon the threads 21 of the rod 20 the position of engagement between the cap 22 and the handle 10 may be adjusted with a corresponding adjustment of the amount of movement between the jaws 11 and 12 both relatively to each other and relatively to the handle 10.

Since the configuration of a six cylinder engine crank shaft is different from that of the crankshaft of a four cylinder engine, in order to increase the utility of the tool the jaws 11 and 12 should be made replaceable by jaws corresponding in configuration to that of a six cylinder engine crankshaft. Such jaws are illustrated in Fig. 3 and are designated as 11a, these being somewhat eccentrically curved to correspond with the shaft of the crankshaft of a six cylinder engine instead of being straight as illustrated in Fig. 1. Replacement of the jaws is made simply by removal of the screws 13 and 25, and replacing the jaws 11 and 12 with the jaws 11a which are secured in position by the reinsertion of the screws 13 and 25 through the openings 13a and 25a respectively of the jaws shown in Fig. 3.

It will therefore be seen that this invention provides a wrench type of tool which is very handy in character and, because of its adjustable features and replaceable jaws, is of wide adaptability; furthermore the construction provides a tool of this character which very easily and automatically increases and releases its hold upon an object such as a crankshaft gripped between the jaws; and while it will be understood that the type of invention specifically illustrated and described herein is a very desirable embodiment and form of tool constructed in accordance with the principles of this invention, yet it will be apparent that changes in the specific details of construction can be made without departing from the inventive concept; it will therefore be understood that it is intended and desired to embrace within the scope of this invention such modifications and changes as may be required to adapt it to varying conditions and uses.

Having thus described our invention, what we claim as new and desire to secure by Letters Patent in the United States, is:

1. A tool comprising a handle member, a pair of cooperating gripping jaws pivotally secured to the handle, means for automatically tightening the gripping action of the jaws upon a member placed therebetween when the handle is moved in one direction, an abutment member upon the handle, a rod connected to the said jaws and passing through the said abutment member, and a stop member adjustably positioned upon the rod, the rod and stop member cooperating to adjust the position of the jaws relatively to each other, and for automatically maintaining the jaws stationary in adjusted position when the handle is moved in the opposite direction without necessitating reversal of the position of the tool.

2. A tool comprising a handle member, a pair of cooperating gripping jaws pivotally secured to the handle, means for automatically tightening the gripping action of the jaws upon a member placed therebetween when the handle is moved in one direction, an abutment member secured to the handle, a rod hingedly connected to the jaws and passing through the said abutment member, the link having its end provided with threads, and a stop member positioned upon the threads and adjustable thereon to engage the abutment member, the said rod and stop member cooperating to adjust the position of the jaws relatively to each other, and for automatically maintaining the jaws stationary in adjusted position when the handle is moved in the opposite direction without necessitating reversal of the position of the tool.

3. A tool of the character described, comprising a handle member, and a jaw unit detachably and adjustably secured to the handle member and comprising a pair of cooperating jaws pivotally interconnected to form an upper jaw and a lower jaw, means for pivotally securing the lower jaw to the handle member to allow angular adjustment of the jaw unit relatively to the handle member, cooperating links adjustably secured to the jaw unit and to the handle member for securing the unit in predetermined position of angular adjustment, an abutment member on the handle, a rod secured to the links and passing through the abutment member, and a cap threadedly mounted on the rod for engagement with the handle and abutment member respectively for causing the jaws to grip a work on clockwise movement of the handle and to release the work upon counter-clockwise movement of the handle.

4. A tool of the character described, comprising a handle, a pair of relatively movable cooperating jaws forming a unit adjustably mounted on the handle, an abutment member on the handle, a rod interconnecting the jaws and abutment member, and a stop member on the said rod adapted to engage the handle and the abutment member selectively, whereby the said jaws are operated to grip the work upon actuation of the handle in one direction, and to release the work upon actuation of the handle in the opposite direction.

In testimony whereof we affix our signatures.

JAMES WAGNER.
ANTON HUMR.